(12) United States Patent  
Onno et al.

(10) Patent No.: US 8,218,541 B2  
(45) Date of Patent: Jul. 10, 2012

(54) METHOD AND DEVICE FOR FORMING, TRANSFERRING AND RECEIVING TRANSPORT PACKETS ENCAPSULATING DATA REPRESENTATIVE OF AN IMAGE SEQUENCE

(75) Inventors: Patrice Onno, Rennes (FR); Xavier Henocq, Melesse (FR); Fabrice Le Leannec, Mouaze (FR)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 12/271,628

(22) Filed: Nov. 14, 2008

(65) Prior Publication Data

US 2009/0135818 A1    May 28, 2009

(30) Foreign Application Priority Data

Nov. 16, 2007  (FR) ...................... 07 08064

(51) Int. Cl.  
*H04L 12/56* (2006.01)
(52) U.S. Cl. ........................ 370/389; 370/474
(58) Field of Classification Search .................. 370/389, 370/394; 380/37; 709/246  
See application file for complete search history.

(56) References Cited

U.S. PATENT DOCUMENTS

| | | |
|---|---|---|
| 6,490,405 B1 | 12/2002 | Speed |
| 7,397,958 B2 | 7/2008 | Le Leannec |
| 7,426,305 B2 | 9/2008 | Denoual |
| 2002/0054215 A1 | 5/2002 | Mizoguchi |
| 2003/0053540 A1* | 3/2003 | Wang et al. ............... 375/240.12 |
| 2003/0135863 A1* | 7/2003 | Van Der Schaar ............... 725/95 |
| 2003/0195988 A1* | 10/2003 | Sahuc et al. ................... 709/246 |
| 2005/0114386 A1 | 5/2005 | Nassor |
| 2005/0122974 A1* | 6/2005 | Hubler .......................... 370/389 |
| 2005/0198676 A1 | 9/2005 | Henocq |
| 2006/0036813 A1 | 2/2006 | Henocq |
| 2006/0171392 A1 | 8/2006 | Jen et al. |
| 2007/0036354 A1* | 2/2007 | Wee et al. ........................ 380/37 |
| 2008/0259927 A1* | 10/2008 | Evans et al. .................... 370/394 |

OTHER PUBLICATIONS

U.S. Appl. No. 12/368,820, filed Feb. 10, 2006.  
U.S. Appl. No. 12/246,372, filed Oct. 6, 2008.

* cited by examiner

*Primary Examiner* — Dang Ton  
*Assistant Examiner* — Mohamed Kamara  
(74) *Attorney, Agent, or Firm* — Fitzpatrick, Cella, Harper & Scinto

(57) ABSTRACT

The present invention relates to a method of forming transport packets for transmitting, from a server device to at least two client devices, data representative of a coded image sequence, the coded data being encapsulated in transport packets comprising a first portion composed of a plurality of fields and a second portion. The method comprises the steps of obtaining (E40) a routing cue for each client device, of forming (E43) at least one transport packet on the basis of coded data, and of modifying (E45) at least one field of the first portion of each transport packet formed as a function of at least one routing cue obtained.  
The invention also relates to an associated device for forming packets, a transfer method and devices and a method and device for receiving transport packets formed according to the method briefly described above.

20 Claims, 8 Drawing Sheets

METHOD AND DEVICE FOR FORMING, TRANSFERRING AND RECEIVING TRANSPORT PACKETS ENCAPSULATING DATA REPRESENTATIVE OF AN IMAGE SEQUENCE

The present invention relates to a method and a device for forming transport packets, a method and a device for transferring transport packets and a method and a device for receiving transport packets encapsulating coded data representative of an image sequence.

The invention lies in the technical field of the transporting of digital data representative of coded image sequences, in a communication network, output by a server device to a plurality of client devices.

Various formats for coding images and video sequences making it possible to obtain, on the basis of a coded data stream, sub-streams corresponding to lower spatial resolutions, lower temporal frequencies and lower qualities are known in the prior art. Such formats are called scalable formats.

In particular, the future SVC (Scalable Video Coding) hierarchical video compression standard, described in the document by T. Wiegand, G. Sullivan, J. Reichel, H. Schwarz, and M. Wien. Scalable Video Coding—Joint Draft 10 of SVC Amendment. Joint Video Team (JVT) of ISO/IEC MPEG & ITU-T VCEG, San Jose, Calif., April 2007. Document JVT-W201, is an extension of the H.264 video standard, affording new functionalities of spatial, temporal and quality scalability, while maintaining an excellent compression rate.

By using the SVC compression format, it is possible, for example, to code a video of high spatial definition (720×576) comprising 60 images per second. The set of data thus coded will be decodable on the basis of an apparatus having good decoding capabilities such as a computer or a television furnished with an internal or external decoder. By virtue of the scalability functionalities of the SVC standard, it is possible to extract from this stream a sub-stream comprising coded data making it possible to reconstruct a sequence of images of spatial resolution 180×144, therefore 4 times smaller heightwise and widthwise, and comprising 15 images per second. Such a stream is easily decodable by an apparatus with low capability such as a portable telephone.

For transporting compressed video sequences over a communication network, it is usual to use the RTP (Real Time Protocol) protocol, which has been defined by recommendation RFC3550 of the IETF, which is suited to real-time data transport. The encapsulation format ('payload format') for data coded according to the SVC format in RTP transport packets is undergoing definition. This format of transport packets is described in the document 'RTP Payload Format for SVC video-draft-ietf-AVT-RTP-SVC-01', by S. Wenger et al. An RTP transport packet comprises a header, which will also be called the first portion and a body, which will also be called the second portion.

A stream in the SVC format is organized into coded data units, known by the name NAL units (Network Abstract Layer Units). One or more coded data units can be encapsulated in the body of the RTP transport packets, according to the encapsulation mode chosen and according to the size of the RTP packets, which can vary from 254 bytes for a wireless network to 1500 bytes for a wire-based IP network. The header of an RTP packet contains fields of predefined type and size, making it possible in particular to implement packet sequence numbers so as to be able to reconstruct the order of the video data even if the communication network changes the order of the packets during transmission.

It is commonplace in a communication network, when transferring transport packets between a server device and a plurality of client devices, to make the transport packets travel via intermediate network devices, also called network nodes or routers.

In the case of transmitting a video coded according to a scalable format, between a server device to a plurality of client devices having heterogeneous processing capabilities, certain transport packets contain coded data belonging to sub-streams, and intended only for certain client devices. This cue regarding the destination of the packets is known at the server device level, but it cannot easily be obtained by an intermediate network device.

Specifically, to ascertain the destination of the coded data units contained in the body of an RTP packet, an intermediate network device must be capable of extracting the data units coded according to the SVC format from the body of the transport packets and of analyzing the syntax of the headers of these data units. The intermediate network device ought therefore to be cognizant of the media transported, such as the SVC coding format in the present example. Thus, the intermediate network device could obtain cues relating to the spatial resolution, to the temporal frequency and to the level of quality to which the various coded data units contribute. On the basis of these cues, the intermediate network device could thereafter transfer the RTP-type transport packets received to the various client devices.

It would be useful to allow the intermediate network devices to route the transport packets in a more systematic and easier manner. This would make it possible to lighten the computational load necessary for the intermediate network devices.

For this purpose, the present invention proposes a method of forming transport packets for transmitting, from a server device to at least two client devices, data representative of a coded image sequence, the coded data being encapsulated in transport packets comprising a first portion composed of a plurality of fields and a second portion. The method comprises the following steps:
- obtaining a routing cue for each client device,
- forming at least one transport packet on the basis of coded data, and
- modifying at least one field of the first portion of each transport packet formed as a function of at least one routing cue obtained.

Thus, the invention makes it possible to convey a cue relating to the routing of the transport packets to one or more client devices, by virtue of a modification of at least one predefined field of a transport packet. This makes it possible to render the subsequent routing of the packets faster and easier, while preserving the same quantity of information to be transmitted.

According to a particular mode of implementation, in the modification step, the value of a field representative of a time marker is modified in such a way as to insert therein the said at least one routing cue.

This mode of implementation is particularly interesting, since it makes it possible to transport the inserted routing cue without disturbing the initial use of the modified field, and in particular without causing appreciable desynchronization of the transport packets.

In a particular mode of implementation, the routing cue represents a class of client device.

Thus, the routing cue is compact and can be coded on a low number of bits.

The step of obtaining a routing cue, according to a mode of implementation of the invention, comprises the sub-steps of:

receiving from each client device at least one cue representative of the processing capability of the said client device, determining a set of classes of client devices as a function of the said cues.

Thus, the classes of client devices used for the implementation of the method are suited to the client devices connected to the server.

In a variant, the method according to the invention furthermore comprises a step of ordering the determined classes of client device in increasing order of the quantity of coded data necessary for the reconstruction of the decoded images intended for the client devices of the said classes of client devices.

This variant is more particularly suited to scalable coding formats in which it is possible to encode data of an enhancement level by prediction with respect to a lower scalability level.

According to a particular mode of the invention, in which the coded data are organized into coded data units, the method comprises, before the formation step, a step of associating at least one coded data unit with at least one class of client device, if the said coded data unit contributes to the reconstruction of a decoded image intended for the said class of client device.

In this particular mode, a transport packet is formed on the basis of at least one coded data unit.

As a variant, a transport packet is formed on the basis of a plurality of coded data units associated with one and the same at least one class of client device.

Thus, it is possible to form transport packets suited to the telecommunications network, while ensuring that the routing of the packets to client devices will be easy.

According to a particular mode of the invention, the modification step comprises, for a transport packet, the sub-steps of:

determining a dependent value of a routing cue for the said transport packet, modifying the value of the said time marker as a function of the determined value.

According to a particular mode of implementation, the determined value is added to the value of the said time marker. This modification of the time marker is particularly fast.

According to a particular mode, the determined value is dependent on the indices of the classes of client device with which the coded data units contained in the body of the said transport packet are associated.

In a variant in which the image sequence is coded on at least two resolution levels, the value determined for a transport packet is equal to the minimum index among the indices of the client device classes associated with the coded data units contained in the said transport packet.

This variant is particularly advantageous, since it makes it possible to further reduce the number of bits necessary to represent the routing cue relating to a transport packet.

Correlatively, the present invention relates to a device for forming transport packets for transmitting, to at least two client devices, data representative of a coded image sequence, the coded data being encapsulated in transport packets comprising a first portion composed of a plurality of fields and a second portion. This device comprises:

means for obtaining a routing cue for each client device, means for forming at least one transport packet on the basis of coded data, and means for modifying at least one field of the first portion of each transport packet formed.

The advantages of this device are the same as the advantages of the method of forming transport packets, they are therefore not recalled here.

According to a second aspect, the invention relates to a method of transferring transport packets containing data representative of a coded image sequence, a transport packet comprising a first portion composed of a plurality of fields and a second portion, from an intermediate device to at least two client devices, implemented by the intermediate device. This method of transferring transport packets comprises the steps of:

receiving a transport packet, extracting from at least one field of the first portion of the transport packet received at least one routing cue, and transferring the transport packet to at least one client device as a function of the said extracted routing cue.

Thus, an intermediate network device implementing this method can easily transfer a transport packet to client devices, after a simple step of extracting at least one field of the first portion of the transport packet received.

According to a particular mode of implementation, the routing cue represents at least one class of client device.

According to a particular mode of implementation, the transfer method comprises, before the reception step, a step of obtaining a cue relating to the class of client device of each client device.

Thus, the intermediate network device can directly utilize the routing cue extracted for transferring the packets to one or more client devices.

According to a particular mode of implementation, in the extraction step, a set of indices, each index being representative of a class of client device, is extracted from a field representative of a time marker.

According to a particularly advantageous mode of implementation, the extraction step comprises a sub-step of binary masking applied to the value representative of a time marker of the said first portion.

This implementation is particularly advantageous, since it is extremely effective from the computational point of view.

In a variant in which the coded data are organized into coded data units and the image sequence is coded on at least two resolution levels, when the coded data units are dependent, in the transfer step, the packet is transferred to all the client devices whose class has an index greater than or equal to the representative index extracted.

Correlatively, the present invention relates to a device for transferring transport packets containing data representative of a coded image sequence, a transport packet comprising a first portion composed of a plurality of fields and a second portion, to at least two client devices. The device for transferring transport packets is noteworthy in that it comprises:

means for receiving a transport packet, means for extracting from at least one field of the first portion of the transport packet received at least one routing cue, and means for transferring the transport packet to at least one client device as a function of the said extracted routing cue.

The advantages of this device are the same as the advantages of the method of transferring transport packets, they are therefore not recalled here.

According to a third aspect, the present invention relates to a method for receiving transport packets containing data representative of a coded image sequence, a transport packet comprising a first portion composed of a plurality of fields and a second portion, implemented by a client device. The reception method is noteworthy in that it comprises the steps of:

receiving a transport packet, extracting from at least one field of the first portion of the transport packet received at least one routing cue, and modifying at least one field of the first portion of the transport packet received as a function of the at least one extracted routing cue.

Thus, a client device can, on receipt of a transport packet formed according to the method of forming transport packets briefly described above, apply a modification to at least one field of the first portion of the packet received, in such a way as to correct this field so as to give it back its initial value.

Correlatively, the present invention relates to a device for receiving transport packets containing data representative of a coded image sequence, a transport packet comprising a first portion composed of a plurality of fields and a second portion. The device for receiving packets is noteworthy in that it comprises:

means for receiving a transport packet, means for extracting from at least one field of the first portion of the transport packet received at least one routing cue, and means for modifying at least one field of the first portion of the transport packet received as a function of the at least one extracted routing cue.

Still with the same aim, the present invention also proposes a computer program which, when it is executed by a computer or a processor in a device for forming transport packets, induces the device to carry out the method of forming transport packets such as briefly described above. Such a computer program can be carried by a physical information medium.

Still with the same aim, the present invention also proposes a computer program which, when it is executed by a computer or a processor in a device for transferring transport packets, induces the device to carry out the method of transferring transport packets such as briefly described above. Such a computer program can be carried by a physical information medium.

Still with the same aim, the present invention also proposes a computer program which, when it is executed by a computer or a processor in a device for receiving transport packets, induces the device to carry out the method for receiving transport packets such as briefly described above. Such a computer program can be carried by a physical information medium.

The particular characteristics and advantages of these computer programs being similar to those of the corresponding methods, they are not repeated here.

According to another aspect, the present invention relates to a signal representative of digital data forming a transport packet comprising a first portion composed of a plurality of fields and a second portion, data representative of a coded image sequence being encapsulated in the second portion, characterized in that at least one field of the first portion is modified as a function of a routing cue relating to at least one client device.

Other features and advantages of the invention will be further apparent in the description hereinafter, illustrated by the appended drawings, in which:

FIG. 1 schematically represents a telecommunications system in which the present invention is implemented;

Figure 7:
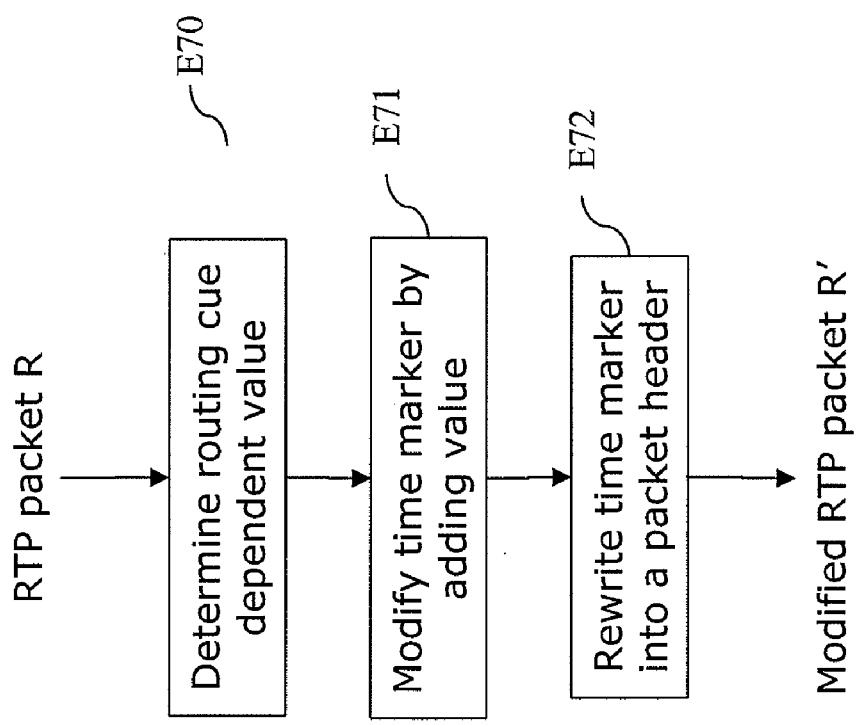
Figure 5:
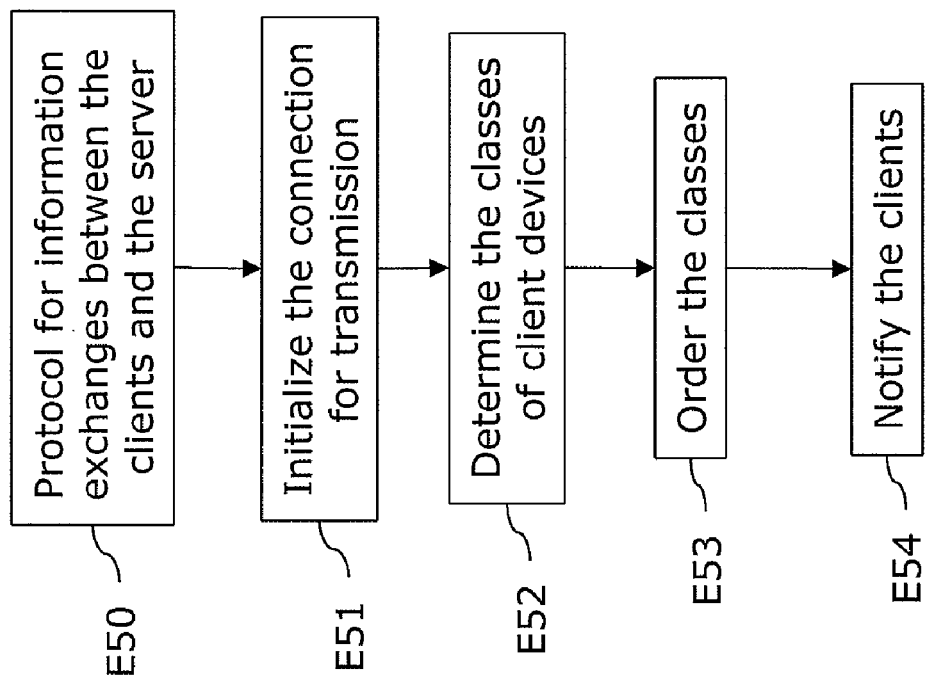
Figure 6:
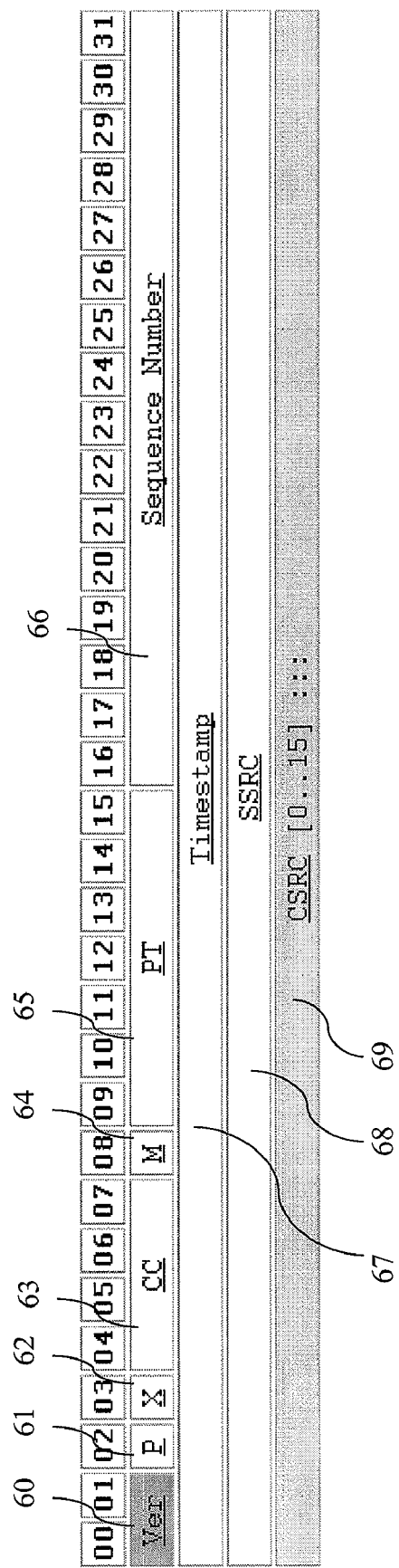
Figure 8:
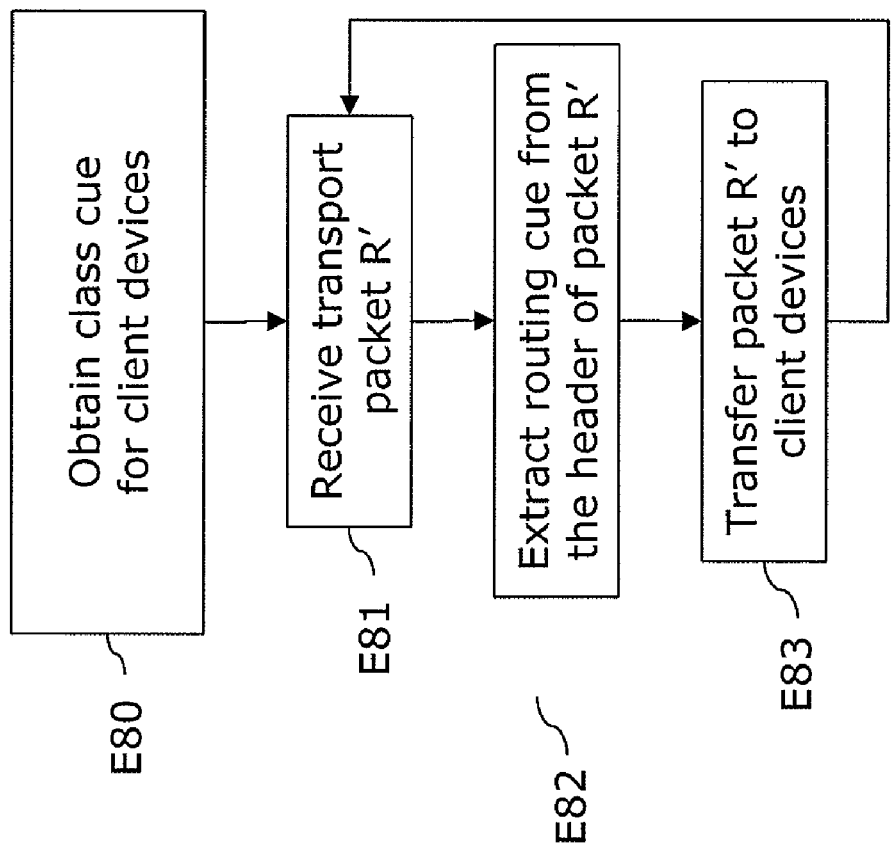
Figure 9:
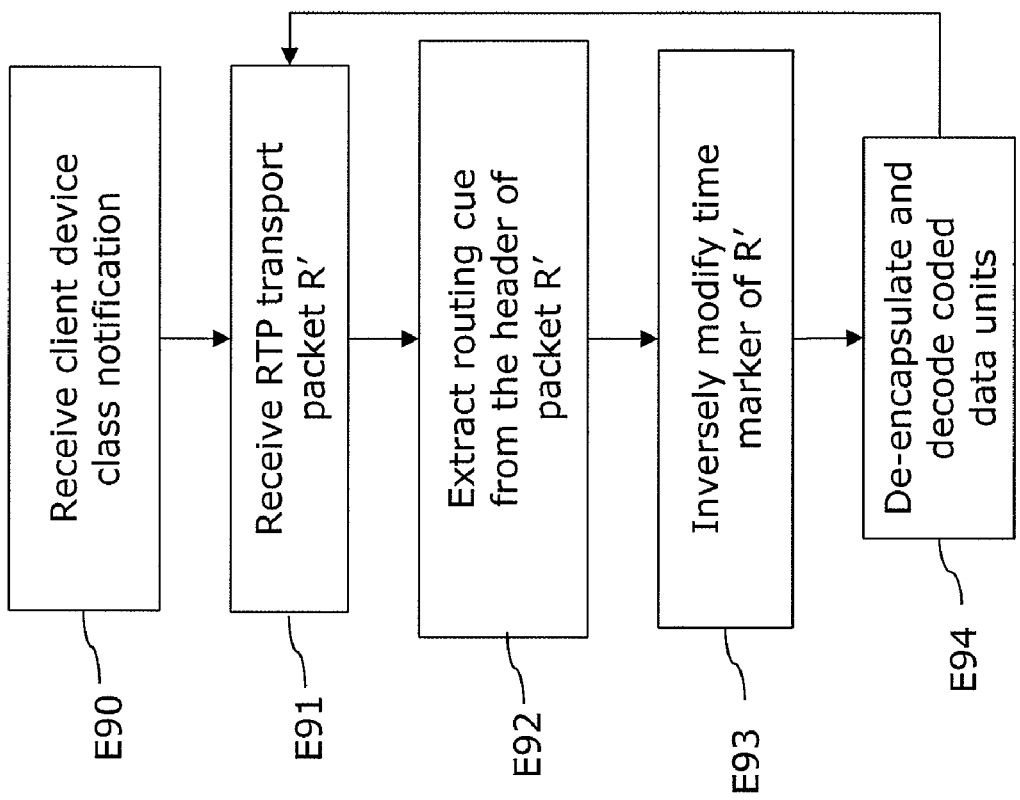

FIG. 5 details the steps for obtaining a routing cue in a mode of implementation of the invention;

FIG. 6 represents a transport packet of RTP type;

FIG. 7 represents the flowchart of an algorithm for modifying an RTP packet header field;

FIG. 8 represents the flowchart of an algorithm for transferring video data transport packets implemented by an intermediate network device;

FIG. 9 represents the flowchart of an algorithm for receiving video data transport packets implemented by a client device.

Figure 1:
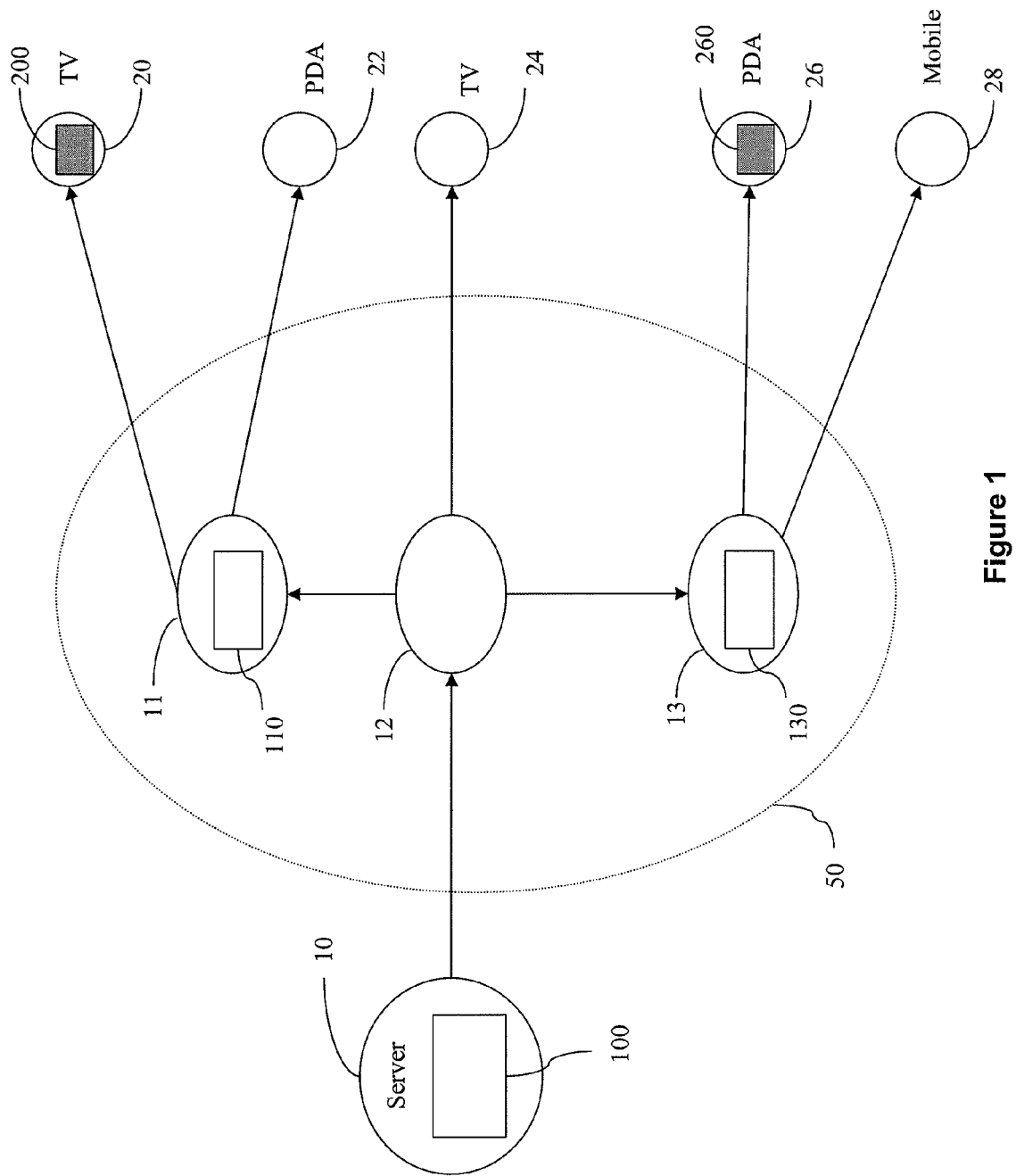

FIG. 1 represents a telecommunications system in which the present invention is implemented.

In FIG. 1, a video server 10 sends coded video data for a plurality of receiver client devices, 20 to 28, by way of a telecommunication network 50. The telecommunication network 50 is, for example, an Ethernet network, an Internet network, a GSM network or an 802.11a or b or g wireless network.

The video server 10 comprises a device 100 for forming transport packets for transmission on the basis of coded data units representative of an image sequence coded, for example, according to the SVC format.

The transport packets formed by the server are preferably packets according to the RTP protocol.

These packets are trunked, in the network 50, to a plurality of intermediate network devices, 11, 12 and 13. Each of the intermediate network devices transfers some of the packets received from the server to one or more client devices.

The client devices have heterogeneous processing capabilities, in terms of display screen size, storage memory and computational capability. In the example of FIG. 1, the client device 28 is a lightweight device, with a screen spatial resolution of 180×144 pixels and low computational capabilities of portable telephone type. The devices 22 and 26 are PDAs ("Personal Digital Assistants"), with a screen spatial resolution of 360×288 pixels, while the devices 20 and 24 are digital televisions furnished with internal or external decoders, with a screen spatial resolution of 720×576 and significant computational capabilities.

In the example of FIG. 1, the intermediate network devices 11 and 13 each respectively comprise a device (110, 130) for transferring transport packets according to the invention.

Thus, the device for transferring transport packets 110 makes it possible to dispatch to the client device 22 only part of the packets received from the server 10, which correspond to the spatial resolution which can be displayed by this device, by applying a fast processing to the headers of the packets received.

Likewise, the device for transferring packets 130 dispatches a subset of the transport packets containing data necessary for reconstructing the spatial resolution 180×144 to the device 28, by applying a fast processing to the headers of the packets received.

The intermediate network device 12, transfers the transport packets received from the server 10 to the client device 24, as well as to the intermediate network devices 11 and 13 in the example of FIG. 1. The implementation of the invention during the formation of the packets does not affect the behaviour of the conventional intermediate network devices, which do not implement the invention.

The client devices 20 and 26 respectively comprise devices 200 and 260 for receiving transport packets according to the invention.

Figure 2:
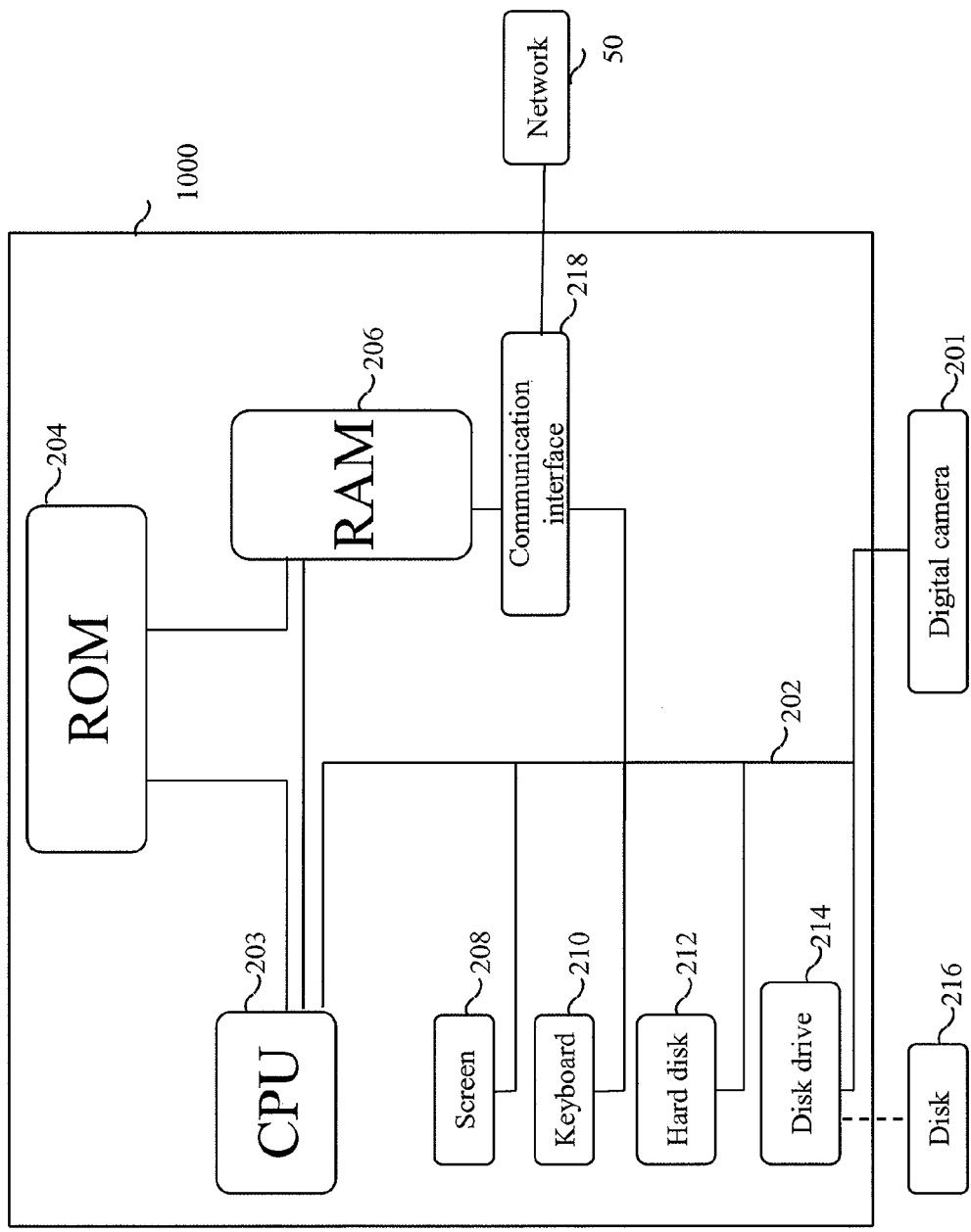
FIG. 2 is a diagram of a processing device suitable for implementing the present invention.

FIG. 2 is a diagram of a processing device 1000 suitable for implementing the present invention, which is either a server device 10, or an intermediate network device 11 or 13, or a client device 20 or 26.

The apparatus 1000 is for example a micro-computer, a television, a workstation or a lightweight portable device.

The apparatus 1000 comprises a communication bus 202 to which are connected:
- a central processing unit 203, such as a microprocessor, denoted CPU;
- a read only memory 204 capable of containing computer programs so as to implement the invention, denoted ROM;
- a random access memory 206, denoted RAM, capable of containing the executable code of the method according to the invention as well as the registers designed to record the variables and parameters necessary for the implementation of the invention; and
- a communication interface 218 linked to the communication network 50 on which digital data are transmitted.

Optionally, the apparatus 1000 can also comprise the following components, included in the embodiment represented in FIG. 2:
- a data storage means 212 such as a hard disk, capable of containing the programs implementing the invention and the data used or produced in the course of the implementation of the invention;
- a disk reader 214 intended for a disk 216, the said disk reader being designed to read data from the disk 216 or to write data to the said disk;
- a screen 208 intended to display data and/or serving as graphical interface with the user, by means of a keyboard 210 or any other pointing means.

The apparatus 1000 can be linked to diverse peripherals, such as for example a digital camera 201, linked to an input/output card (not represented) so as to provide the apparatus 1000 with data representative of an image sequence.

The communication bus 202 allows communication and interoperability between the various elements included in the apparatus 1000 or linked to the latter. The representation of the bus is not limiting and, in particular, the central processing unit is capable of communicating instructions to any element of the apparatus 1000 directly or by means of some other element of the apparatus 1000.

The disk 216 can be replaced with any information medium such as for example a rewritable or nonrewritable compact disc (CD-ROM), a ZIP disk or a memory card and, in general terms, with an information storage means which can be read by a micro-computer or by a microprocessor, incorporated or not into the apparatus, possibly removable and designed to store one or more programs whose execution allows the implementation of the method of forming transport packets according to the invention, of the method of transferring transport packets according to the invention and of the method for receiving transport packets according to the invention.

The executable code allowing the apparatus to implement the invention can be stored either in the read only memory 204, or on the hard disk 212, or on a removable digital medium such as for example a disk 216 as described previously. According to a variant, the executable code of the programs can be received by means of the telecommunication network 50, via the interface 218, so as to be stored in one of the storage means of the apparatus 1000 before being executed, such as the hard disk 212.

The central processing unit 203 is designed to control and direct the execution of the instructions or parts of software code of the program or programs according to the invention, the said instructions being stored in one of the abovementioned storage means. On power-up, the program or programs stored in a nonvolatile memory, for example on the hard disk 212 or in the read only memory 204, are transferred to the random access memory 206, which then contains the executable code of the program or programs according to the invention as well as registers intended to store the variables and parameters necessary for the implementation of the invention.

It is appropriate to observe that the apparatus can also be a programmed apparatus. This apparatus then contains the code of the computer program or programs, for example fixed in an integrated circuit specific to the application (Application Specific Integrated Circuit or ASIC).

Figure 3:
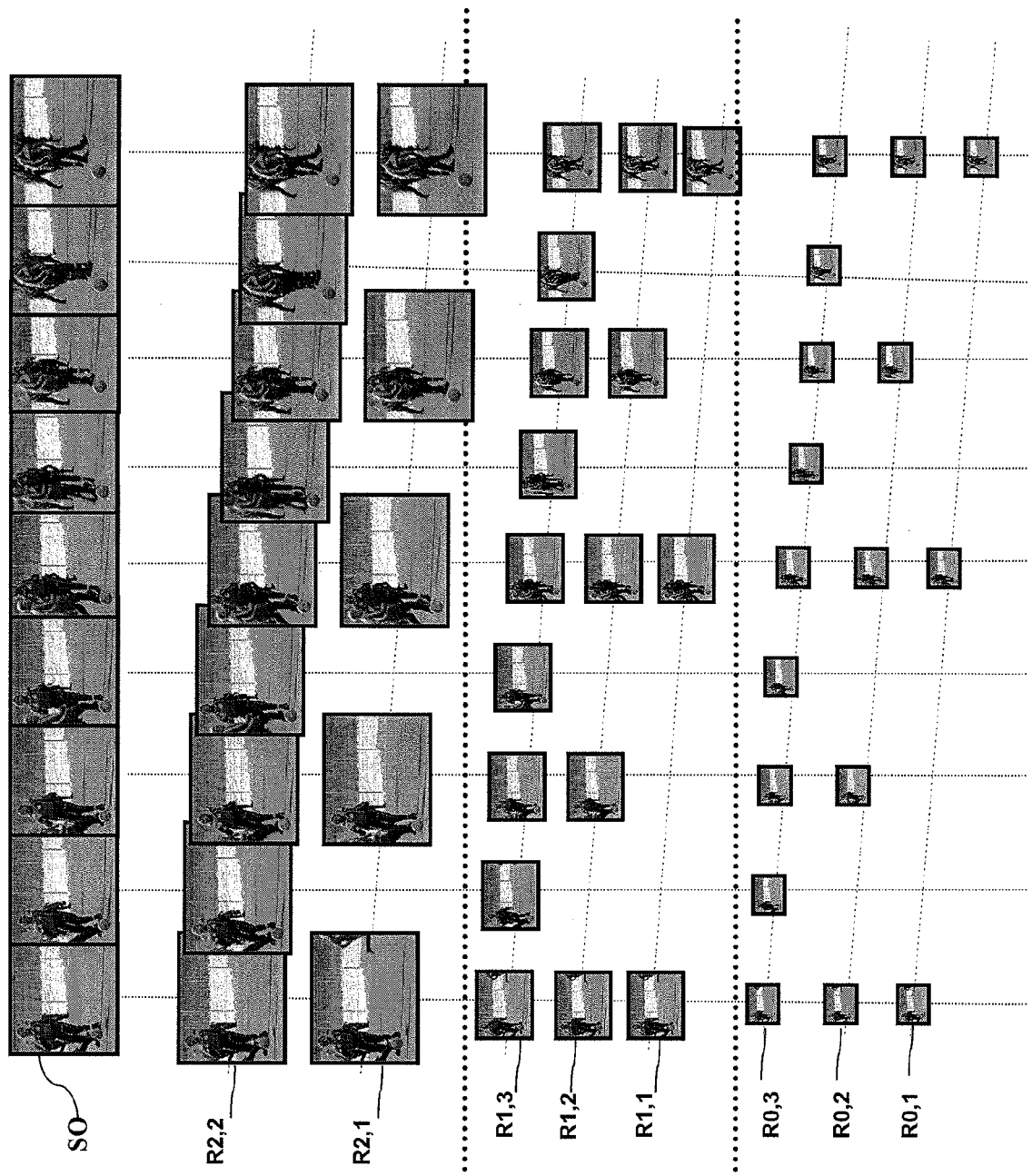
FIG. 3 illustrates an image sequence coded according to a scalable format.

FIG. 3 makes it possible to schematically illustrate the new spatial and temporal scalability functionalities offered by the SVC compression format. The SVC format also makes it possible to obtain scalability in terms of quality, which is not illustrated here.

As explained beforehand, the invention finds a particularly beneficial application within the framework of the transmission of image sequence data coded according to the SVC scalable compression format, but could be applied with other coding formats.

Represented in the example of FIG. 3 is an original image sequence S0, in the 720×576 format, comprising 60 images per second.

On the basis of this original image sequence, it is possible to obtain data sets coded according to the SVC format, making it possible to reconstruct the sets of the sequences represented, R0,1 to R2,2.

The sequences R2,1 and R2,2 are at the same spatial resolution as the original sequence, 720×576, but have different temporal resolutions: R2,2 is at 60 Hz, and R2,1 at 30 Hz.

The sequences R1,1 to R1,3 are coded at a lower spatial resolution R1, equal to 360×288. For this spatial resolution, three dyadic temporal resolutions are represented: R1,1 is at 15 Hz, R1,2 at 30 Hz and R1,3 at 60 Hz.

The sequences R0,1 to R0,3 are at the lowest spatial resolution, 180×144 in this example, and as previously, three temporal resolutions are represented: R0,1 is at 15 Hz, R0,2 at 30 Hz and R0,3 at 60 Hz.

Finally, the SVC standard makes it possible to allocate a variable throughput to each image of each of the sequences R0,1 to R2,2, so as to obtain scalability in terms of quality.

The example of FIG. 3 illustrates streams formed with a ratio of two in each dimension for switching from a spatial resolution to the lower spatial resolution, but it is also possible to apply other ratios, and in particular to apply a different ratio according to height and width, so as to be able to accommodate the various screen sizes.

In a typical application scenario of the invention, the sequence R0,1 is intended for a mobile telephone, the sequence R1,2 for a PDA (22,26) and R2,2 for a digital television (20,24).

According to the SVC compression format, data of a higher resolution level are predicted with respect to a lower resolution level, and only the prediction errors are coded to obtain the enhancement data sufficient to represent the higher resolution level. Sub-streams which are coded in an interleaved and interdependent manner can be extracted from an SVC stream, each sub-stream of higher resolution level encoding enhancement data for the lower level stream.

The sub-streams encoded in the stream in the SVC format are therefore coded in an interdependent manner.

Thus, in the example above, the set of coded data necessary for the reconstruction of the sequence R1,2 is formed of the set of the coded data contributing to the reconstruction of the images of the sequence R0,1 as well as the enhancement data contributing to the sequences R0,2 to R1,2.

Figure 4:
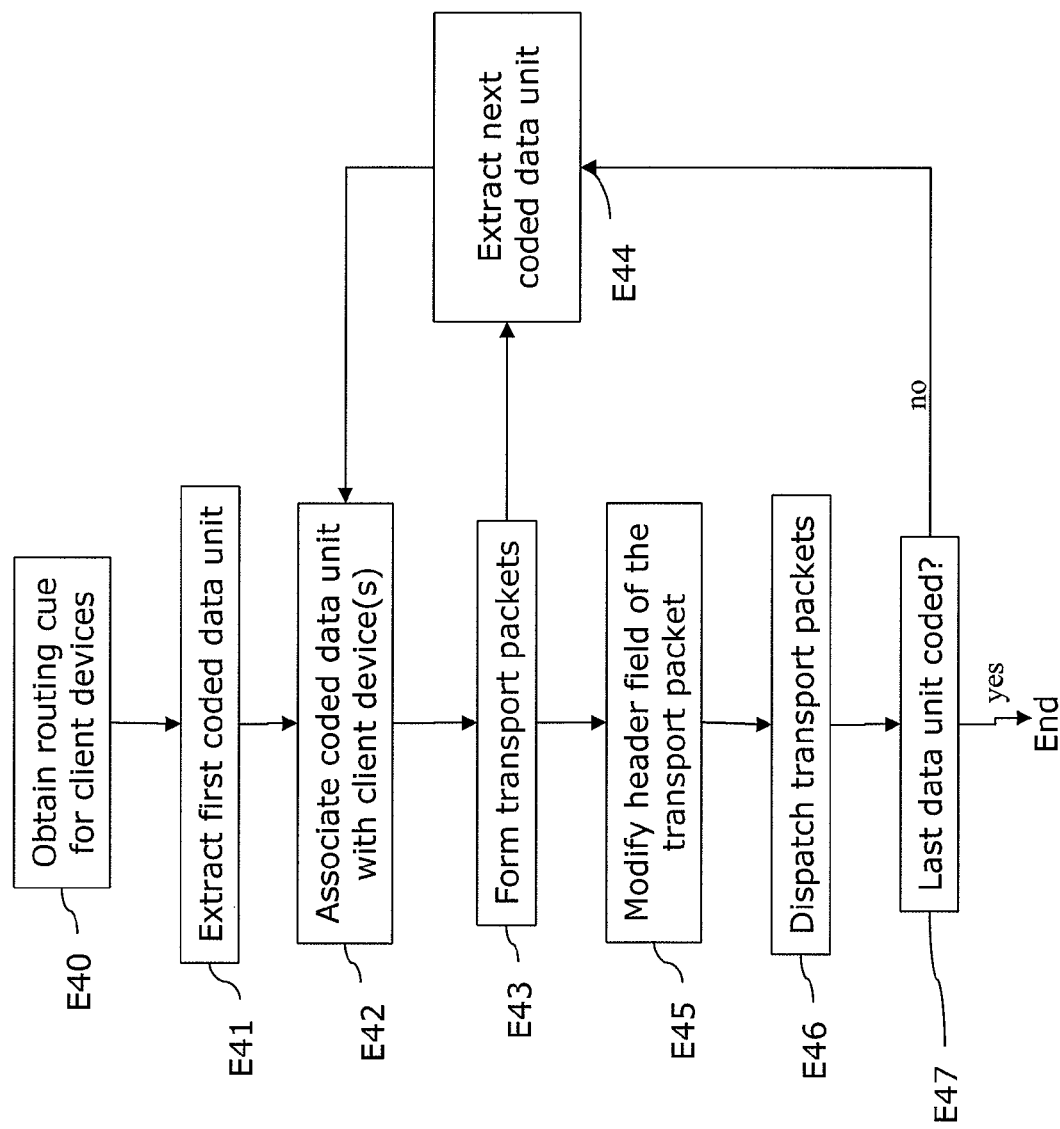
FIG. 4 represents the flowchart of an algorithm for forming video data transport packets implemented by a server device.

FIG. 4 represents the flowchart of an algorithm for forming video data transport packets implemented by a server device. All the steps of the algorithm represented in FIG. 4 can be implemented in software form and executed by the central processing unit 203 of the device 1000.

The present algorithm is executed by the server device during the transmission of data representative of a coded image sequence to at least two client devices.

During the first step E40, the server device obtains a routing cue relating to each client device. The routing cue relating to a client device is linked to the spatial, temporal and quality resolution of the decoded sequence to be received by this client device. This cue is preferably a cue which can be represented on a low number of bits. In the preferred mode of implementation, the routing cue is a client device class index, as explained hereinafter with reference to FIG. 5.

Step E40 is followed by step E41, in which the first coded data unit to be processed is considered. Within the framework of the SVC format, a coded data unit is a unit of NAL type.

Step E41 is followed by step E42, with which the coded data unit undergoing processing is associated with one or more classes of client devices, if this coded data unit contributes to the reconstruction of an image of this class of client device. As explained above with reference to FIG. 3, in the case of the SVC format, coded data units contribute to the formation of several decoded images of various resolution levels. In this case, these units must be received by all the client devices which must receive one of the resolution levels to which they contribute.

This association is stored in an appropriate register of the random access memory 206 of the device 1000.

Thereafter, in step E43, transport packets for transmission over the network are formed. In the preferred mode of implementation, these packets are formed according to the RTP protocol.

One or more coded data units are included in the second portion of an RTP packet, called the body, as a function for example of the maximum size MTU (acronym of "Maximum Transfer Unit") of a packet before the said packet is split up by the devices of the telecommunication network.

In a mode of implementation of the invention, a single coded data unit (NAL) is inserted into the body of an RTP packet.

In an alternative mode of implementation, in which one seeks to form a transport packet having a size that is as close as possible to the size MTU, several compressed data units can be inserted into one and the same packet. In this case, if the size MTU is not reached, step E43 is followed by step E44 of extracting the next coded data unit, itself followed by step E42 described previously. If several coded data units have to be included in one and the same transport packet, during the formation step E43, a check is carried out to verify that they are associated with the same class or the same classes of client device.

In the case where a coded data unit has a size which exceeds the size MTU, it is possible to split it up so as to encapsulate it in several RTP packet bodies.

During the formation step E43, the first portion or header of the packet is also created, in accordance with the recommendation 'RTP Payload Format for SVC video-draft-ietf-AVT-RTP-SVC-01', by S. Wenger et al.

A header according to this format is represented in FIG. 6, containing the whole set of the following fields, detailed in table 1:

TABLE 1

RTP header fields

| Reference FIG. 6 | Field name | Number of bits | Use |
| --- | --- | --- | --- |
| 60 | Ver = 2 | 2 | Version |
| 61 | P | 1 | Padding use flag |
| 62 | X | 1 | Existence of header extension |
| 63 | CC | 4 | Number of source contribution indicators |
| 64 | Marker bit | 1 | Indicator of the last packet |
| 65 | Payload type | 6 | Definition of the transported type of media |
| 66 | Sequence Number | 16 | Order of decoding of packets |
| 67 | Timestamp | 32 | Time marker |
| 68 | SSRC | 32 | Source synchronization indicator |
| 69 | CSRC | 32 | Source contribution indicator |

The main role of RTP is to implement packet sequence numbers (field 66), so as to be able to reconstruct the video data even if the underlying network changes the order of the transport packets.

The type of data transported in the body of the packet is specified by the field 65. The field 61 indicates the existence of a packet extension, and in the case where such an extension is present (X=1), an extension of 16 bits after the field 69 indicates a number of fields of 32 bits which follow. According to recommendation RFC3550 of the IETF, the use of the header extension must be limited, on account of the increase in the size of the RTP packet.

Fields 63, 68 and 69 relate to the source or sources of the coded data.

Returning to FIG. 4, after finalizing the formation of transport packets, step E43 is followed by step E45 in which the header of the RTP packet already formed is modified, so as to include therein a cue regarding routing to one or more client devices of the said packet. In the preferred mode of implementation, detailed in FIG. 7, it is the field representative of the time marker which is modified. Such a modification is particularly advantageous, since the time marker field thus obtained transports the routing cue as well as the initial information, and can therefore be used at one and the same time by an intermediate network device implementing the invention and by a conventional network device.

Moreover, such a routing cue is transported without increasing the size of the RTP transport packet.

The modification step E45 is followed by step E46 of dispatching the packets to the client devices, via one or more intermediate network devices.

This step is followed by step E47, in which a check is carried out to verify whether the last coded data unit has been processed. If the response is negative, step E47 is followed by step E44 previously described. If the response is positive, the algorithm ends.

FIG. 5 details the steps of obtaining a routing cue in a mode of implementation of the invention.

All the algorithm steps represented in FIG. 5 can be implemented in software form and executed by the central processing unit 203 of the device 1000.

In step E50 an information exchange protocol is performed between the server and the clients. This step makes it possible to ascertain the CPU resources, the memory capabilities and possibly the resolution of the display screen of the client device.

In practice, such an initialization step is implemented between the server and each client.

Preferably, the RTSP protocol ("Real-Time Streaming Protocol") is used.

Each client 20 to 28 sends for example an RTSP DESCRIBE request to the video server 10, so as to ascertain the characteristics of the image sequence stored on the server and to transmit an identifier of URI type, the acronym standing for "Uniform Resource Identifier", corresponding to its characteristics. In return, the server 10 transmits a description of the image sequence in SDP form ("Session Description Protocol"—IETF recommendation RFC2327).

The following step E51 corresponds to the initialization of the connection for transmission, by way of an RTSP SETUP command.

Step E51 is followed by step E52 of determining classes of client devices.

The server may already have in memory a set of predetermined classes, corresponding to the types of client devices expected, for example 3 in number in the example of FIG. 1, corresponding to the clients of portable telephone type (class 0), of PDA type (class 1) and of digital television type (class 2).

Thereafter, a predefined class of client device is associated with each client device, as a function of its characteristics gathered during step E50.

Alternatively, the server can define a set of classes as a function of the first connected client devices, and possibly dynamically increase or reduce the number of classes as a function of the new connected client devices. It is then necessary to update the class allocation of each connected client device.

Step E52 is followed by the optional step E53 of ordering the classes of client device that were determined in increasing order of the quantity of coded data necessary for the reconstruction of the decoded images intended for the client devices of the said classes of client devices. Step E53 is not performed if the coded data units are independent.

Step E53, or step E52 if step E53 is not performed, is followed by step E54 of notifying the client devices of their associated routing cue, that is to say of an index representative of their membership class in this mode of implementation.

This notification can be done by using the SET PARAMETER command of the RTSP protocol. The SET PARAMETER command travels through the intermediate network devices 11, 12, 13 which are placed between the server 10 and the client devices 20 to 28. Thus, the intermediate network devices also take cognizance of the routing cue associated with the client devices, as explained hereinafter with reference to FIG. 8.

Other useful cues for the subsequent processing of the transport packets by intermediate network devices can also be transmitted by the use of the RTSP SET PARAMETER command. For example, in an embodiment, the maximum frequency $F_{max}$ of the coded image sequence is notified to the intermediate network devices via a SET PARAMETER command.

FIG. 7 represents the flowchart of an algorithm for modifying an RTP packet header field, detailing a mode of implementing step E45 of FIG. 4. All the algorithm steps represented in FIG. 7 can be implemented in software form and executed by the central processing unit 203 of the device 1000.

The algorithm of FIG. 7 receives as input a transport packet in the RTP format, denoted R.

The first step E70 determines a value dependent on a routing cue relating to the transport packet R.

In practice, one begins by determining the indices $C_R$ representative of the classes of client devices for which the packet R is intended.

Two modes of operation are envisaged according to the dependency of the coded data units.

In the general case, it is considered that the coded data units may or may not be independent, therefore a coded data unit can contribute to the image reconstruction(s) belonging to one or more resolution levels. In this case, an RTP transport packet can be associated with one or more classes of client devices. In this case, $C_R=\{i\}$ if $I(R,i)=1$, where $I(R,i)=1$ when the packet R contributes to the reconstruction of the data to be dispatched to the class of client devices of index i.

A value V(R) is then determined in step E70 such that:

$$V(R) = \sum_{i=0}^{i<NC} I(R, i) \cdot 2^i \qquad (Eq\ 1)$$

where NC is the total number of classes of client devices. In the example of FIG. 1, NC=3.

Stated otherwise, V(R) is the integer number coded on NC bits, such that each bit of order i is equal to 1 if the packet R is intended for a client device of index class i.

For example, if the packet R is intended at one and the same time for the client devices of index class 0 and of index class 2, we obtain V(R)=5.

In the case where the coded data units are dependent, as explained above with reference to FIG. 3, a coded data unit is associated with several classes of client devices.

In this case, the representative index associated with the packet R is the minimum index of the client device classes associated with the coded data units contained in the packet.

Specifically, in the case of the interdependence of the coded data units associated with various resolutions, a coded data unit which serves for the reconstruction of a resolution level also serves for the reconstruction of all the higher resolution levels.

It is possible in the case of the dependent coded data units to further optimize the processing according to the invention, by minimizing the number of bits necessary for encoding the routing cue.

Stated otherwise, if $I(R,j)=1$ then $I(R,i)=1$ for any $j \geq i$.

In this case, a value V(R) is determined in step E70, such that:

$$V(R)=i_{min} \qquad (Eq2)$$

where $i_{min}$ is the minimum index of the client device classes associated with the coded data units contained in the packet.

Step E70 is followed by step E71, in which the field representative of the time marker 67 is modified as a function of the value dependent on the routing cue V(R) determined in step E70.

The value of the time marker 67, coded on 32 bits, is obtained initially by taking into account the temporal frequency $F_t$ of the image sequence, and a fixed clock frequency of 90000 Hz, as indicated in the recommendation 'RTP Payload Format for SVC video-draft-ietf-AVT-RTP-SVC-01', by S. Wenger et al.

Thus, for a set of coded data units encapsulated in an RTP packet R and having a presentation time t, the time marker is defined by:

$$TS(R) \doteq 90000 \cdot \frac{t}{F_t} + t_0 \qquad \text{(Eq 3)}$$

where $t_0$ is the initial instant of presenting the data.

It is then easy to deduce the time interval $DTS(F_t)$ between two packets transporting coded data corresponding to two successive images of a sequence of temporal frequency $F_t$. We give below a few examples of time intervals for usual temporal frequencies.

For example, when $F_t$=30 Hz, $DTS(F_t)$=3000;
For $F_t$=29.97 Hz, $DTS(F_t)$=3003;
For $F_t$=15 Hz, $DTS(F_t)$=6000.

In the preferred mode of implementation, it is the value representative of the time marker which is modified, since there exists a large number of possible values between two consecutive images, and it is consequently possible to slightly modify the value of the time marker while preserving its initial use.

In the preferred mode of implementation, in step E71 the value V(R) previously obtained is added to the value of the time marker:

$$TS'(R)=TS(R)+V(R) \qquad \text{(Eq4)}$$

As a variant, the value of V(R) can be subtracted from the value of TS(R) to obtain the modified value of the time marker.

In a more general manner, it is possible to use any function $f(TS(R), V(R))$, such that $f$ is an invertible function which hardly modifies the initial value TS(R).

The modification step is followed by step E72, in which the value of the modified time marker is re-inserted into the header of the packet R. Thus, a transport packet having a modified header R' is obtained.

FIG. 8 represents the flowchart of an algorithm for transferring video data transport packets implemented by an intermediate network device. All the algorithm steps represented in FIG. 8 can be implemented in software form and executed by the central processing unit 203 of the device 1000.

The present algorithm is executed by an intermediate network device (11, 13) for processing packets formed by a server (10) implementing a method of forming transport packets in accordance with the invention.

In a first preliminary step E80, the intermediate network device receives and stores a cue relating to the class of each client device to which it must transfer data. As explained above with reference to step E54 of FIG. 5, during the initialization of the connection between a client device and a server device, the server notifies the client of its membership class according to a classification determined by the server. This notification is done for example by way of a SET PARAMETER command of the RTSP protocol. The request travels via the intermediate network devices, which can then obtain and store the routing cues associated with the client devices in the form of indices representative of the classes of client devices.

This step E80 can be performed once during session setup, or possibly several times, in the event of a dynamic change of assignment of the classes of client devices, as explained above with reference to FIG. 5.

Step E80 is followed by step E81 of receiving a data transport packet R'. In the preferred mode of implementation, an RTP packet is considered.

The reception step is followed by step E82 of extracting a routing cue relating to the routing packet R', from a field of the header of the packet R'.

In the preferred mode of implementation, it is considered that the server device has modified the time marker field 67 as described above with reference to FIG. 7.

As in the case envisaged at the server, in this exemplary implementation the transport packets encapsulate, in their second portion or body, one or more coded data units representative of an image sequence, contributing to the reconstruction of one or more resolution levels of the decoded image sequence. It is possible to distinguish, just as for the modification of the headers of RTP transport packets at the level of the server device, between the case where the coded data units are dependent and that where the coded data units are independent.

During step E82, the maximum temporal frequency $F_{max}$ of the coded image sequence which is transmitted is used. As explained above with reference to FIG. 5, the value of the maximum temporal frequency can be notified to the intermediate network devices via an RTSP SET PARAMETER command. This value is received in step E80 and stored in the memory 206 of the intermediate network device.

This frequency $F_{max}$ is used to determine the maximum integer value m such that:

$$TS(R')-m \cdot DTS(F_{max}) \geqq 0$$

Thereafter, the value of the difference $X(R')=TS(R')-m \cdot DTS(F_{max})$ is taken, which makes it possible thereafter to deduce a routing cue in the form of a client device class index, which has been inserted into the time marker field of the header of the RTP packet.

In the general case, where the coded data units may or may not be independent, and may therefore contribute to the reconstruction of decoded images for one or more classes of client devices, in the preferred mode of implementation, as many binary comparison operations, also called binary maskings, are applied as the number NC of classes of client devices. For example, when NC=3, the following operations are applied:

$$\text{if } X(R') \, \& \, 001=1, \, 0 \in C_{R'} \qquad \text{(Eq5)}$$

$$\text{if } X(R') \, \& \, 010=1, \, 1 \in C_{R'} \qquad \text{(Eq6)}$$

$$\text{if } X(R') \, \& \, 100=1, \, 2 \in C_{R'} \qquad \text{(Eq7)}$$

For example, if $X(R') \, \& \, 001=1$ and $X(R') \, \& \, 100=1$, then $C_{R'}=\{0,2\}$, therefore the packet R' is intended for the classes of client devices of indices 0 and 2.

In the case where the coded data units are dependent and interleaved, a simple binary comparison operation, also called binary masking, is preferably applied to deduce a routing cue in the form of a client device class index on the basis of the value X(R'):

$$i_{R'}=X(R') \, \& \, 11 \qquad \text{(Eq8)}$$

This equation amounts to extracting the value encoded by the low-order bits of the value X(R') to deduce the value of the index $i_{R'}$. In this mode implemented, the packet R' is then intended for the classes of client devices of indices $j \geqq i_{R'}$.

Quite obviously, the examples given here for a set of three classes of client device generalize in a direct manner to a larger number of classes of client devices.

Note here that in the usual cases where the maximum video frequencies are respectively equal to 15 Hz, 25 Hz and 30 Hz, the time interval DTS is a multiple of 10. In this case, it is possible to consider X(R')=TS(R') directly, thereby further simplifying the calculations.

For the two modes envisaged, whether the coded data units are dependent or independent, the extraction of a routing cue can be performed very simply by applying a binary mask to the low-order bits of the value X(R'), which is very effective from the computational point of view.

Step E82 is followed by step E83 of transferring the packet received R' to one or more client devices, as a function of the routing cue extracted in step E81 and of the previously stored class membership cue of the client devices.

In the case where the coded data units are independent, the packet is routed directly to the client devices whose class is indicated by the indices belonging to $C_{R'}$.

In the particular case where the coded data units are dependent, a transport packet R' is dispatched to all the clients belonging to a class of index greater than or equal to the index $i_{R'}$ extracted.

Thus, if $i_{R'}=0$, the packet is transferred to all the classes of client device, therefore to all the client devices linked to the intermediate network device which performs the processing.

If the index $i_{R'}=1$, the packet is transferred to the receivers of classes 1 and 2, therefore for the receivers of PDA (22 and 26) and digital television (20) type in the example of FIG. 1.

If the index $i_{R'}=2$, the packet is transferred to the client devices of class 2 only.

Step E83 is followed by step E81 previously described for the processing of a new packet.

FIG. 9 represents the flowchart of an algorithm for receiving video data transport packets implemented by a client device. All the algorithm steps represented in FIG. 9 can be implemented in software form and executed by the central processing unit 203 of the device 1000.

The present algorithm is executed by a client device (20, 26) for processing packets formed by a server (10) implementing a method of forming transport packets in accordance with the invention and having travelled via intermediate network devices.

In a first preliminary step E90, the client device receives a server device notification, on the basis of which it can obtain and store a routing cue relating to the class which has been assigned thereto by the server device. As explained above with reference to step E54 of FIG. 5, during the initialization of the connection between a client device and a server device, the server notifies the client of its membership class according to a classification determined by the server. This notification is done for example by way of a SET PARAMETER command of the RTSP protocol.

This step E90 can be performed once during session setup, or possibly several times, in the event of a dynamic change in the assignment of the classes of client devices, as explained above with reference to FIG. 5.

Step E90 is followed by the reception step E91, in which an RTP transport packet containing coded data representative of an image sequence is received.

Step E91 is followed by step E92 of extracting a routing cue inserted into the first portion or header of the packet received R'. This step is analogous to step E82 described with reference to FIG. 8.

In the general case, where the coded data units may be independent, by applying the operations described with reference to step E82 a set of indices of client device classes $C_{R'}$, to which the packet R' has been dispatched, is extracted.

In the particular case of the dependent and interleaved coded data units, the extracted routing cue is a client device class index $i_{R'}$.

This step is followed by step E93, of inverse modification of a header field of the RTP packet received.

In the preferred exemplary implementation, when the value of the field representative of the time marker has been modified according to the mode of implementation described with reference to FIG. 7, the value of this field is modified during step E93. The aim of the modification is to remove the routing cue which has been inserted into the time marker so as to give this time marker back its initial value.

In the general case, the value V(R') to be subtracted from the value of the time marker can be deduced:

$$V(R') = \sum_{i=0}^{i<NC} L(R',i) \cdot 2^i$$

where $L(R',i)=1$ if $i \in C_{R'}$

In the particular case of the dependent coded data units, the value V(R') to be subtracted from the value of the time marker is given by:

$$V(R')=i_{R'}$$

Thereafter, the inverse modification of the time marker consists in subtracting the value V(R') from the current value of the time marker:

$$TS_{final}(R')=TS(R')-V(R')$$

In a more general manner, the inverse function of the function f applied in step E71 is applied to obtain the value $TS_{final}(R')$ from the values TS(R') and V(R').

The value obtained, $TS_{final}(R')$, is identical to the value of the time marker before modification so as to insert therein a routing cue.

Step E93 is followed by step E94, for de-encapsulating the coded data units of the body of the transport packet. These units are passed to a decoder of data coded according to the coding format considered, SVC in this mode of implementation, for decoding.

Step E94 is followed by step E91 described earlier, for processing another RTP transport packet.

Note here that a client device which does not contain a device for receiving transport packets according to the invention can nevertheless process the RTP packets received and decode the image sequence transported in these packets. In this case, the display of the decoded images will be slightly shifted, but the display frequency will be complied with. The shift due to the modification of the time marker remains small when a relatively limited number of classes of client device is considered. For example, when the value of the time marker is shifted by +1, this corresponds to only 0.333 ms for a sequence of temporal frequency 30 Hz.

This application claims priority from French application no. 07/08064 filed on 16 Nov. 2008, which is hereby incorporated by reference in its entirety.

The invention claimed is:

1. A method of forming transport packets for transmitting, from a server device to at least two client devices, data representative of a coded image sequence, the coded data being encapsulated in transport packets comprising a first portion composed of a plurality of fields and a second portion, the method comprising:
   obtaining information representing a class of a client device, the class being representative of a processing capability of the client device for each client device;
   forming at least one transport packet on the basis of coded data; and
   modifying at least one field representative of a time marker of the first portion of each transport packet, which has already been formed as a function of the information representing the class of the device, by determining a value dependent on the information representing the class of the device for the transport packet, and modifying the value of the time marker as a function of the determined value.

2. The method of forming transport packets according to claim 1, wherein obtaining the information representing the class of the device comprises:
receiving from each client device information representative of the processing capability of the client device; and
determining a set of classes of client devices as a function of the received information representative of the processing capability of the client device.

3. The method of forming transport packets according to claim 2, further comprising:
ordering the determined classes of client device in increasing order of the quantity of coded data necessary for the reconstruction of the decoded images intended for the client devices of the classes of client devices.

4. The method of forming transport packets according to claim 1, wherein the coded data is organized into coded data units, and further comprising, before forming at least one transport packet:
associating at least one coded data unit with at least one class of client device, if the coded data unit contributes to the reconstruction of a decoded image intended for the class of client device.

5. The method of forming transport packets according to claim 4, wherein a transport packet is formed on the basis of at least one coded data unit.

6. The method of forming transport packets according to claim 5, wherein a transport packet is formed on the basis of a plurality of coded data units associated with one and the same at least one class of client device.

7. The method of forming transport packets according to claim 1, wherein the determined value is dependent on indices of the classes of client device with which the coded data units contained in the body of the transport packet are associated.

8. The method of forming transport packets according to claim 7, in which the image sequence is coded on at least two resolution levels, wherein the value determined for a transport packet is equal to a minimum index among the indices of the client device classes associated with the coded data units contained in the said transport packet.

9. A method of transferring transport packets containing data representative of a coded image sequence, a transport packet comprising a first portion composed of a plurality of fields and a second portion, from an intermediate device to at least two client devices, the method being implemented by the intermediate device, comprising:
receiving a transport packet;
extracting, from at least one field representative of a time marker of the first portion of the received transport packet, information representing a class of a client device, the class being representative of a processing capability of the client device, wherein, the at least one field representative of the time marker of the first portion of the transport packet has been modified by a device which formed the received transport packet by determining a value dependent on the information representing the class of the device for the transport packet, and modifying the value of the time marker as a function of the determined value; and
transferring the transport packet to at least one client device as a function of the extracted information.

10. The method of transferring transport packets according to claim 9, further comprising, before the reception of the transport packet, obtaining information relating to the class of client device of each client device.

11. The method of transferring transport packets according to claim 9, wherein, during extraction, a set of indices, each index being representative of a class of client device, is extracted from a field representative of a time marker.

12. The method of transferring transport packets according to claim 11, wherein the extraction comprises binary masking applied to the value representative of a time marker of the first portion.

13. The method of transferring transport packets according to claim 12, in which the coded data is organized into coded data units and the image sequence is coded on at least two resolution levels, wherein, when the coded data units are dependent, the packet is transferred to all the client devices whose class has an index greater than or equal to the representative index extracted.

14. A method for receiving transport packets containing data representative of a coded image sequence, a transport packet comprising a first portion composed of a plurality of fields and a second portion, the method being implemented by a client device, comprising:
receiving a transport packet;
extracting, from at least one field representative of a time marker of the first portion of the received transport packet, information representing a class of device, the class being representative of a processing capability of the client device; and
modifying at least one field representative of a time marker of the first portion of the transport packet received as a function of the extracted information by determining a value dependent on the information representing the class of the device for the transport packet, and modifying the value of the time marker as a function of the determined value.

15. A device for forming transport packets for transmitting, to at least two client devices, data representative of a coded image sequence, the coded data being encapsulated in transport packets comprising a first portion composed of a plurality of fields and a second portion, comprising a controller configured to:
obtain information representing a class of client device, the class being representative of a processing capability of the client device, for each client device;
form at least one transport packet on the basis of coded data; and
modify at least one field representative of a time marker of the first portion of each transport packet, which has already been formed as a function of the obtained information representing the class of the device, by determining a value dependent on the information representing the class of the device for the transport packet, and modifying the value of the time marker as a function of the determined value.

16. A device for transferring transport packets containing data representative of a coded image sequence, a transport packet comprising a first portion composed of a plurality of fields and a second portion, to at least two client devices, comprising a controller configured to:
receive a transport packet,
extract from at least one field representative of a time marker of the first portion of the received transport packet information representing a class of a client device, the class being representative of a processing capability of the client device, wherein, the at least one field representative of the time marker of the first portion of the transport packet has been modified by a device which formed the received transport packet by determining a value dependent on the information representing the class of the device for the transport packet, and modifying the value of the time marker as a function of the determined value; and transfer the transport packet to at least one client device as a function of the extracted information.

17. A device for receiving transport packets containing data representative of a coded image sequence, a transport packet comprising a first portion composed of a plurality of fields and a second portion, comprising a controller configured to:

receive a transport packet;

extract from at least one field representative of a time marker of the first portion of the received transport packet, information representing a class of a client device, the class being representative of a processing capability of the client device, and modify at least one field representative of a time marker of the first portion of the received transport packet as a function of the extracted information by determining a value dependent on the information representing the class of the device for the transport packet, and modifying the value of the time marker as a function of the determined value.

18. A non-transitory computer-readable storage medium storing a computer program wherein, when the computer program is executed by a computer or a processor in a device for forming transport packets, the computer program induces the device to carry out a method of forming transport packets for transmitting, from a server device to at least two client devices, data representative of a coded image sequence, the coded data being encapsulated in transport packets comprising a first portion composed of a plurality of fields and a second portion, the method comprising:

obtaining information representing a class of a client device, the class being representative of a processing capability of the client device, for each client device;

forming at least one transport packet on the basis of coded data; and modifying at least one field representative of a time marker of the first portion of each transport packet, which has already been formed as a function of the obtained information, by determining a value dependent on the information representing the class of the device for the transport packet, and modifying the value of the time marker as a function of the determined value.

19. A non-transitory computer-readable storage medium storing a computer program which, when the computer program is executed by a computer or a processor in a device for transferring transport packets, the computer program induces the device to carry out a method of transferring transport packets containing data representative of a coded image sequence, a transport packet comprising a first portion composed of a plurality of fields and a second portion, from an intermediate device to at least two client devices, comprising:

receiving a transport packet;

extracting, from at least one field representative of a time marker of the first portion of the received transport packet, information representing a class of a client device, the class being representative of a processing capability of the client device, wherein, the at least one field representative of the time marker of the first portion of the transport packet has been modified by a device which formed the received transport packet by determining a value dependent on the information representing the class of the device for the transport packet, and modifying the value of the time marker as a function of the determined value; and transferring the transport packet to at least one client device as a function of the extracted information.

20. A non-transitory computer-readable storage medium storing a computer program which, when the computer program is executed by a computer or a processor in a device for receiving transport packets, the computer program induces the device to carry out a method for receiving transport packets containing data representative of a coded image sequence, a transport packet comprising a first portion composed of a plurality of fields and a second portion, implemented by a client device, comprising:

receiving a transport packet;

extracting, from at least one field representative of a time marker of the first portion of the received transport packet, information representing a class of a client device, the class being representative of a processing capability of the client device; and modifying at least one field representative of a time marker of the first portion of the received transport packet as a function of the extracted information, by determining a value dependent on the information representing the class of the device for the transport packet, and modifying the value of the time marker as a function of the determined value.

* * * * *